US006789571B2

(12) United States Patent
Sekiguchi

(10) Patent No.: US 6,789,571 B2
(45) Date of Patent: Sep. 14, 2004

(54) LIQUID DILUTION DEVICE

(75) Inventor: Shinichi Sekiguchi, Odawara (JP)

(73) Assignee: Mikuni Corporation, Kanagawa (JP)

( * ) Notice: Subject to any disclaimer, the term of this patent is extended or adjusted under 35 U.S.C. 154(b) by 91 days.

(21) Appl. No.: 10/060,681

(22) Filed: Jan. 30, 2002

(65) Prior Publication Data

US 2002/0100514 A1 Aug. 1, 2002

(30) Foreign Application Priority Data

Jan. 30, 2001 (JP) ....................................... 2001-020949
Oct. 9, 2001 (JP) ....................................... 2001-311609

(51) Int. Cl.[7] ................................................ G05D 11/03
(52) U.S. Cl. ................... 137/599.03; 137/893; 251/207
(58) Field of Search ............... 137/269, 599.03–599.04, 137/605, 893; 251/206, 207

(56) References Cited

U.S. PATENT DOCUMENTS 2,948,296 A * 8/1960 Thorburn .................... 251/207
RE25,037 E * 9/1961 Brazier ....................... 137/893
3,090,564 A * 5/1963 Gilmour ...................... 251/207
3,762,439 A * 10/1973 Heath ......................... 137/893
3,996,126 A 12/1976 Rasmussen

FOREIGN PATENT DOCUMENTS

EP 0 792 584 A 9/1997

OTHER PUBLICATIONS

Patent Abstract of Japan, 08 24863 A vol. 1996, No. 5, May 31, 1996.

* cited by examiner

*Primary Examiner*—Stephen M. Hepperle
(74) *Attorney, Agent, or Firm*—Harness, Dickey

(57) ABSTRACT

A liquid diluting device, with a small and simple structure, is capable of reliably sealing and simply changing dilution concentration. Diluent passages are formed in a first body, and a connecting passage for introducing special liquid connects to these diluent passages. A cylindrical dial covering an opening section of the connecting passage is rotatably provided on an outer section of the first body, a plurality of jets passing through from the inside to the outside are formed in conjunction with this cylindrical dial, and the diameters of the plurality of jets are different. A liquid supply passage is set at a position opposite the connecting passage, so that the cylindrical dial is sandwiched between the liquid supply passage and the connecting passage, and the connecting passage and the liquid supply passage are connected by a jet having a diameter matching the dilution factor to introduce special liquid from the liquid supply passage to one of the diluent passages. In this way, by rotatably attaching the cylindrical dial in which the plurality of jets are formed to the first body, it is possible to have a small and simple structure, and also to easily change the dilution factor by merely turning the dial.

26 Claims, 6 Drawing Sheets

LIQUID DILUTION DEVICE

The present application claims priority under 35 U.S.C. §119 on Japanese Application Nos. 2000-020949 filed Jan. 30, 2001 and 2001-311609 filed Oct. 9, 2001, the entire contents of each of which are hereby incorporated herein by reference.

FIELD OF THE INVENTION

The present invention generally relates to a liquid dilution device. More specifically, it relates to a liquid dilution device for diluting a special liquid.

BACKGROUND OF THE INVENTION

Liquid dilution devices have been used to dilute special liquids such as a chemical liquid or detergent, with a diluent such as water. Generally, a liquid dilution device includes a diluent passage for allowing passage of water (water), a negative pressure generating section formed in order to generate negative pressure midway along the diluent passage, and a liquid introduction passage connected at one end to a special liquid tank, formed inside a body. By causing water, for example, to flow in the diluent passage due to the negative pressure generated in the negative pressure generating section, and the special liquid is mixed with the water or the like to be diluted.

In known systems, since, depending on the special liquid, it may be desirable to increase the dilution factor of that liquid, various methods having a high liquid dilution factor have been considered.

Firstly, it has been considered to fix jets inside a hose connecting a special liquid tank to the liquid dilution device, and to interchange these jets. However, the process involved in a user changing the jets is inferior, both with regard to efficiency and interchangeability. Also, in the even that dilution factor is increased, it is necessary to reduce the diameter of the jets. But the diameter of the jets can only be made so small, beyond which it is not possible to increase the dilution factor. It has also been considered to provide a dilution factor adjustment mechanism separately from the liquid dilution device. But in this case, there is the drawback that the device becomes large overall.

Secondly, it has been considered to provide dilution factor switching device in the liquid dilution device itself. A known liquid dilution device provided with dilution factor switching device is shown in FIG. 4 and FIG. 5, and the switching device itself is shown in FIG. 6.

Inside the body 60, there is formed one diluent passage 62 for introducing a diluent, such as water. This diluent passage 62 includes a venturi section 64 formed at a mid-point as a negative pressure generating section having the smallest cross sectional area, and a diffusion section 66 formed at a downstream side of this venturi section 64. A connecting passage 68 for connecting the diffusion section 66 and the outer side of the body 60 is formed in the body 60.

A disc 72, held between the body 60 and a holding member 70, is provided on the outer side of the body 60 in the vicinity of an opening section of the connecting passage 68, as dilution factor switching device. This disc 72 is rotatably attached to the body 60 and the holding member 70 via a bearing 76, centering around a shaft 74 as fixing element for fixing the holding member 70 to the body 60. As shown in FIG. 6, a plurality of jets 78, respectively varying in diameter, are formed in this disc 72 on the same radius from a rotation center position.

In addition to the holding member 70, a liquid introduction device 80 is provided on an opposite side to the body 60 so as to sandwich the disc 72. The liquid introduction device 80 is fixed to the body 60. This liquid introduction device 80 is formed from a first body 82 and a second body 84, and a liquid supply passage 86 connecting to a special liquid tank, not shown, is formed inside the first body 82 and the second body 84. This liquid supply passage 86 is connected to a connecting passage 68 of the body 60 through a jet 78 formed in the disc 72.

A ring shaped seal member 88 is attached at positions of the body 60 meeting the disc 72 and at positions surrounding the disc 72 and at positions surrounding the connecting passage 68. This ring shaped seal member 88 is for preventing leakage of water from the diluent passage 62 from a joining surface of the body 60 and the disc 72. A ring-shaped seal member 90 is attached at positions of the body 82 of the liquid introduction device 80 meeting the disc 72 and at positions surrounding the liquid from the liquid supply passage 86 from a joining surface of the body 82 of the liquid introduction device 80 and the disc 72. An elastic member 92 is provided at a position of the body 60 meeting the disc 72 and at a position separated from the ring shaped seal member 88.An elastic member 94 is provided at a position of the holding member 70 meeting the disc 72 and at a position separated from the seal member 90 These elastic members 92 and 94 act to prevent the disc 72 from leaning towards either the body 60 or the holding member 70.

The connecting passage 68 of the body 60 and the liquid supply passage 86 of the liquid introduction device 80 are connected through the jet 78 by lining up one of the plurality of jets 70 formed in the disc 72 with the connecting passage 68 of the body 60. In this way, if the connecting passage 68 and the liquid supply passage 86 are connected through the jet 78. Special liquid is introduced from the liquid supply passage 86 into the diluent passage 62 by negative pressure generated in an enlarged section 66 of the diluent passage 62. At this time, it is possible to vary the flow amount of the special liquid passing through the jet 78 to change the dilution factor, by rotating the disc 72 to line up one of the plurality of jets 78 with the connecting passage 68 and the liquid supply passage 86.

In the case of using the disc 72 in the dilution factor switching device, the two surfaces of the disc 72 are sealed by seal members 88 and 90. Since each of the jets 78 of the disc 72 is sealed by the ring shaped seal members 88 and 90, it is not possible to bring each of the jets 78 close to the center of rotation of the disc 72. This means that, as shown in FIG. 5, there is the drawback that the diameter of the disc 72 becomes larger than the diameter of the body 60 to increase the overall size of the device, and it becomes impossible to install a device of such a large size in a mains water tap.

Further, it is not possible to bring the jets 78 close to the center of rotation of the disc 72, because the disc 72 swings about the rotation position. When the disc is rotated causing variations in the distance between the disc 72 and the seal members 88 and 90, there is the drawback that sealing of the special liquid from the liquid introduction device 80 is not actually performed.

SUMMARY OF THE INVENTION

The present invention is intended to solve one or more of above described problems, and/or other problems. An object of the present invention is to provide a liquid diluting device.

In one embodiment, a liquid diluting device includes a small and simple structure. Preferably, the liquid diluting device is capable of performing sealing; and/or is capable of easily altering a diluent concentration.

A liquid diluting device of one embodiment of the present invention includes a diluent passage formed in a body, and a negative pressure generating section formed in the diluent passage. It further may include a connecting passage, with one end connecting to the negative pressure generating section and another end connecting to an outer side of the body, formed in the body. A cylindrical dial, for closing off the connecting passage, may be rotatably attached to the outer side of the body. Jets, including different diameters passing through from inside to outside at a plurality of positions confronting the connecting passage, may be formed in the dial. A liquid introduction device forming a liquid supply passage for special liquid is attached to the body so that the liquid supply passage is positioned facing the connecting passage and the connecting passage. Finally, the liquid supply passage may be connected together through jets of different cross sectional area by rotating the dial.

BRIEF DESCRIPTION OF THE DRAWINGS

The invention will be described hereinafter by way of example, referring to preferred embodiments and by illustration of drawing figures, wherein.

DETAILED DESCRIPTION OF THE PREFERRED EMBODIMENTS

An embodiment of the present invention will now be described based on the drawings.

Figure 1:
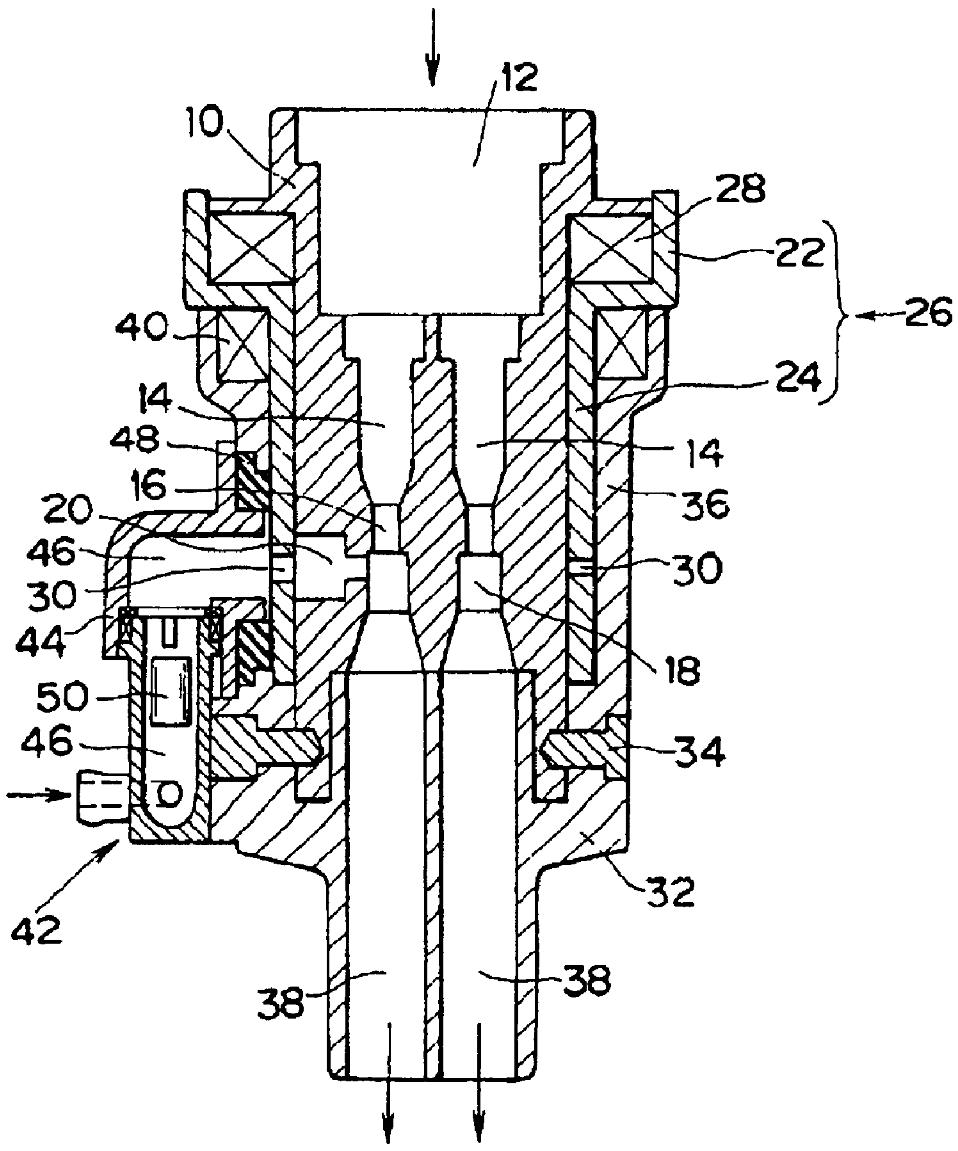
FIG. 1 is a cross sectional drawing showing one embodiment of a liquid diluting device of the present invention.
Figure 2:
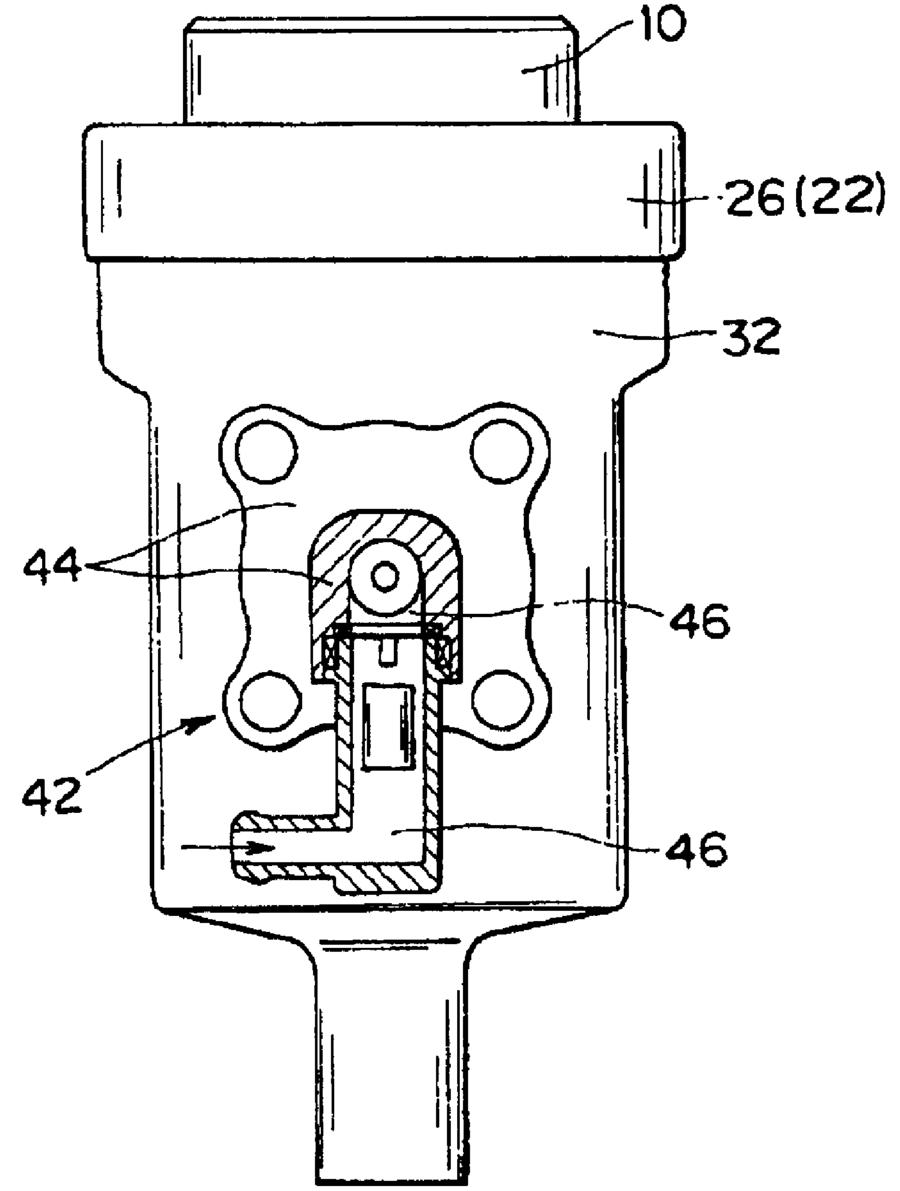
FIG. 2 is a partial cross sectional side elevation of FIG. 1.

FIG. 1 is a cross sectional drawing showing one embodiment of a liquid diluting device of the present invention. FIG. 2 is a partial cross sectional side elevation drawing of FIG. 1.

A diluent main passage 12 for introducing a diluent, such as water for example, is formed inside a first body 10.

This diluent main passage 12 branches into a plurality of diluent passages 14 (for example) at a mid point. In at least one diluent passage 14 among the plurality of diluent passages 14, a negative pressure generating section is formed. This can include, for example, a venturi section 16, as a negative pressure generating section having a relatively smaller cross section; and a diffusion section 18, as a negative pressure generating section having a relatively larger diameter than the venturi section 16 at a downstream side (with the diluent main passage 12 being at an upstream side) of the venturi section 16. A connecting passage for connecting this diffusion section 18 and the outer side of the first body 10 can be formed in the first body 10. In one embodiment, the connecting passage 20 is preferably only formed at one place in the first body 10. Diluent passages 14 that are not connected to the connecting passage 20 need not be provided with the venturi section 16 and the diffusion section 18.

A dial (switch) 26 can include a large diameter section 22 and a small diameter section 24, can be cylindrical for example, and can be rotatably provided on the outer side of the first body 10.

Specifically, a central rotation axis of the dial 26 can be set so as to be parallel to a flow of water or the like in the diluent main passage 12 and the diluent passages 14. An oil seal 28 can be provided between an outer wall surface of the first body 10 and an inner wall surface of the large diameter section 22 of the dial 26. There may be contact between an inner wall surface of the small diameter 24 and the outer wall surface of the first body 10. The small diameter section 24 of the dial 26 may cover the connecting passage 20 of the first body 10, and a plurality of jets 30 (passages) connecting from the inside to the outside of the small diameter section 24 can be formed at circumferential positions meeting the connecting section 20 of the small diameter section 24. The plurality of jets 30, in one embodiment, have respectively different diameters. Although two jets 30 are shown in FIG. 1, the present invention is not limited to two jets as additional jets may also be included.

A second body 32 can be fixed to the first body 10 by fixing device 34. A cylindrical section 36 for covering the outer side of the small diameter section 24 of the dial 26, and a plurality of discharge passages 38 for respectively connecting the plurality of diluent passages 14, can be formed in the second body 32. When the first body 10 and the second body 32 are fixed in the fixing device 34, an oil seal 40 can be provided between the inner side of the cylindrical section 36 of the second dial 32 and an outer side of the small diameter section 24 of the dial 26. With the first body 10 and the second body 32 fixed together, the large diameter section of the dial 26 can be exposed to the outer side of the second body 32. By turning the large diameter section 22 of the dial 26, it is possible to rotate the dial 26 freely with respect to the first body 10 and the second body 32.

A liquid introduction device 42 can be attached to the second body 32 at a position opposite to the connecting passage 20 of the first body 10, sandwiching the dial 26. This liquid introduction device 42 includes a body 44, and a liquid supply passage 46 formed inside the body 44 for connecting to a special liquid tank (not shown). The body 44 can be fixed to the second body 32 via an annular seal member 48 using a fixing device (not shown), for example. With the body 44 fixed to the second body 32, the liquid supply passage 46 can be set so as to be opposite the connecting passage 20 of the first body 10, sandwiching the small diameter section 24 of the dial 26. Further, the connecting passage 20 of the first body 10 and the liquid supply passage 46 of the liquid introduction device 42 can be connected by aligning the connecting passage 20 of the first body 10 with a jet 30 of the dial 26.

When the body 44 of this liquid introduction device 42 is fixed to the second body 32, the annular seal member 48 is caught between the body 44 and an outer surface of the dial 26, and an inner side of the annular seal member 48 is arranged at a position so that special liquid from the liquid supply passage 46 pass through towards the jets 30 of the dial 26. With the body 44 of the liquid introduction device 42 fixed to the second body 32, the annular seal member 48 is pressed towards the outer surface of the dial 26 by the body 44, and leakage of special liquid from the contacting surfaces of the outer surface of the dial 26 and the annular seal member 48 is prevented.

In the state with the connecting passage 20 of the first body 10 connected to the liquid supply passage 46 of the liquid introduction device 42 through the jets 30, if diluent flows in the diluent passage 14, special liquid passes from the liquid supply passage 46 through the jet 30 under negative pressure generated in the negative pressure generating section of the diluent passage 14, and is introduced into the diluent passage 14.

A float 50 can be provided midway along the liquid supply passage 46 of the liquid introduction device 42. The body 44 can be transparent at the position where the float 50 is provided. In the event that liquid is flowing in the liquid supply passage 46 by looking at the position where the float 50 has moved or risen up.

With an embodiment of the present invention having the above described structure, the dial 26 can be turned to select a jet 30 (passage) having a diameter that matches a desired dilution factor from among multiple jets 30 having different diameters. This selected jet 30 can be lined up with the connecting passage 20 of the first body 10. If water, for example, is introduced into the diluent main passage 12, the water can be discharged from the plurality of discharge passages 38 through the plurality of diluent passages 14. In this case, special liquid can be supplied to one diluent passage 14 through the liquid supply passage 46, a jet 30 and the connecting passage 20, and the special liquid can be mixed in this one diluent passage 14. Specifically, a mixture of the special liquid and water can be discharged from one discharge passage 38 from among the plurality of discharge passages 38, while water is discharged from the other discharge passages 38. Thus, the overall operation of the liquid diluting device can be to carry out dilution at a factor corresponding to the number of diluent passages 14. Of course, the invention should not be limited as such as, if desired, multiple jets of each of a plurality of diameters can be included (at opposing positions in a cylinder for example) for introducing a special liquid into more than one diluent passage 14 (through multiple liquid supply passages, for example).

With an embodiment of the present invention, in the even that the dilution factor is changed, it is possible to change the dilution factor and vary a concentration of the liquid supplied through the liquid supply passage, by simply turning the dial 26 to a position lining up a jet 30 of a desired diameter with the connecting passage 20 (thereby aligning a passage (jet 30) of a desired diameter with a connecting passage 20 and the liquid supply passage). Here, in the liquid dilution device, if the dial 26 (which can be a cylindrical dial 26, for example) is formed on an outer side of the body (cylindrical dial 26 parallel to a direction of running water, for example), it is possible to make it easy to change a dilution factor and vary the concentration of the supplied liquid, with the simple operation of merely turning the dial 26. This can be done with a small simple structure, by forming a plurality of jets 30 in the deal 26. A device that achieves this simple operation with a small simple structure can also be applied to an apparatus having only one diluent passage.

When the liquid introduction device 42 is fixed to the first body 10, the seal member 48 can be caught between the body 44 of the liquid introduction device 42 and an outer surface of the dial 26. By having an arrangement such that the seal member 48 is pressed towards the outer surface side of the dial 26 by the body 44, it is possible to simply attach the seal member 48. Also, with an embodiment of the present invention provided with the jets 30, in the cylindrical dial 26, at the time of rotation in order to change the positions of the jets 30 there is no rocking of the cylindrical dial 26. As a result of this, since there is no variation in the positional relationship between the cylindrical dial 26 and the seal member 48, it is possible to reliably prevent leakage of the special liquid from the liquid diluting device 42.

Figure 3:
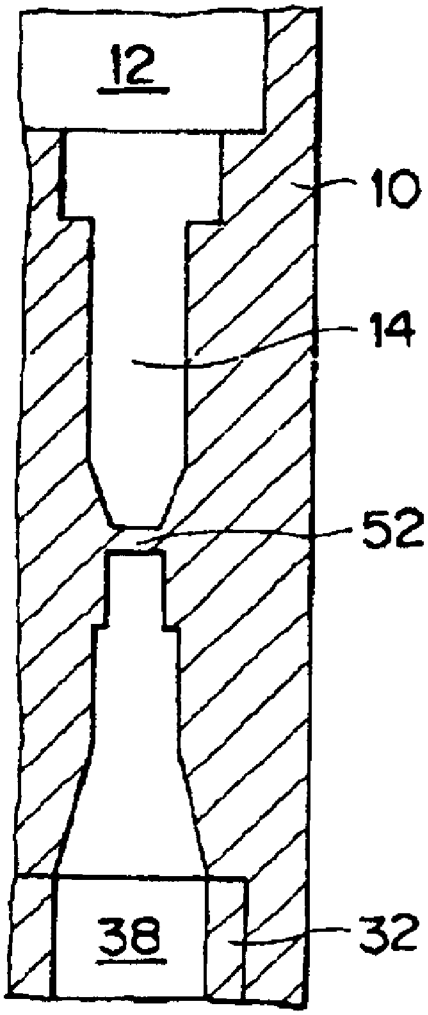
FIG. 3 is a parts cross sectional drawing showing an embodiment of a diluent passage.
Figure 4:
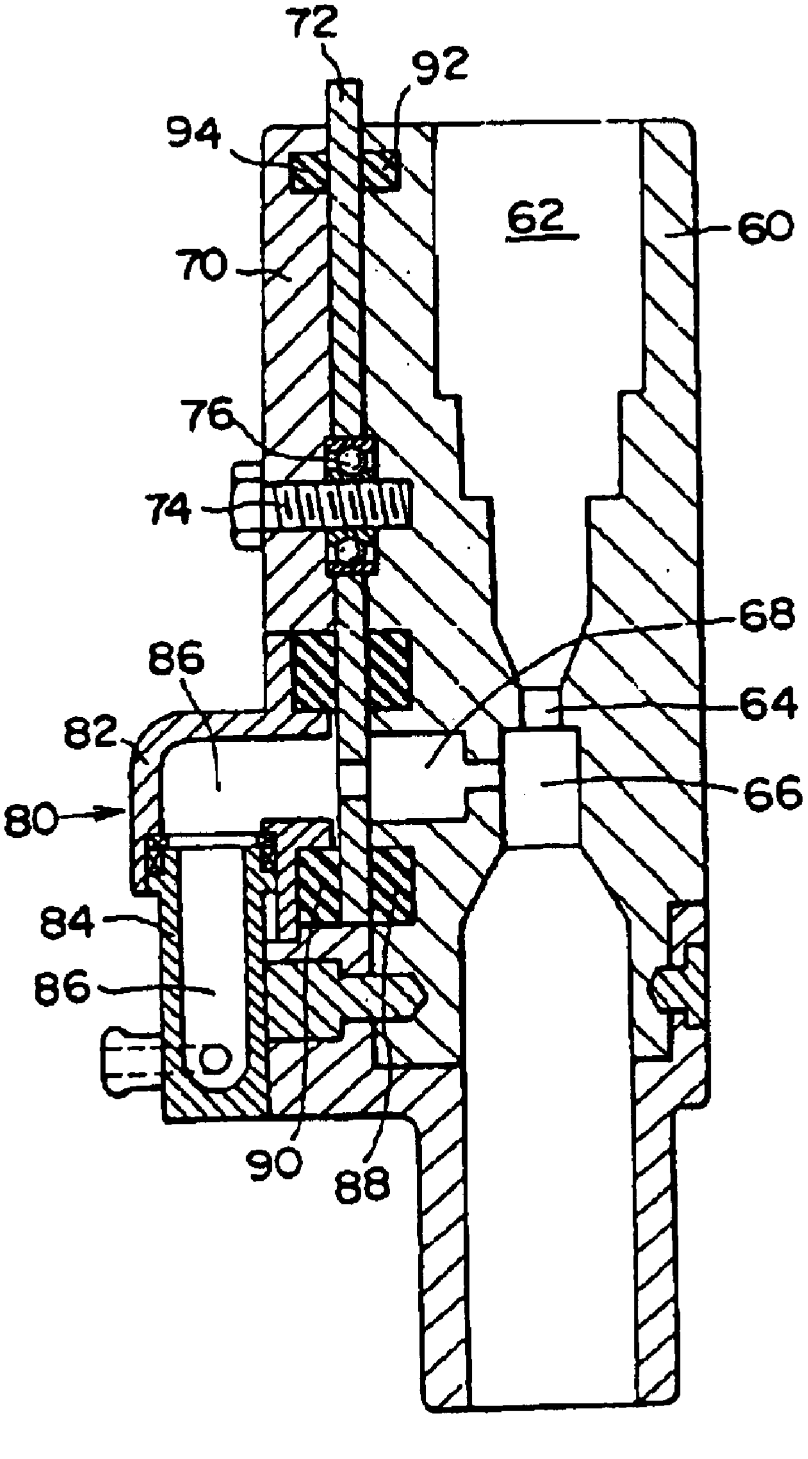
Fig. 4 CONVENTIONAL ART
FIG. 4 is a cross sectional drawing of a known liquid diluting device.
Figure 5:
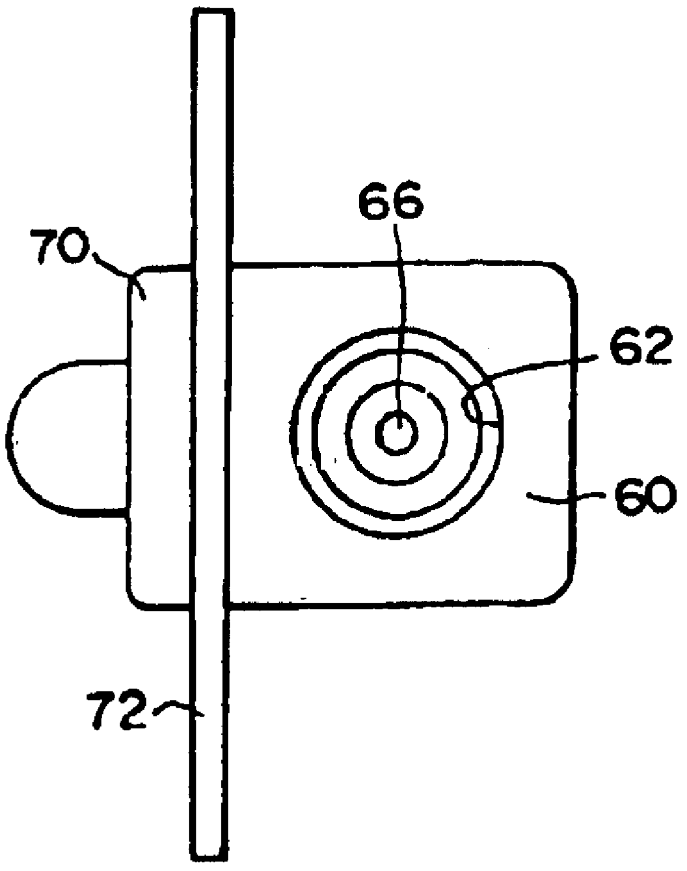
Fig. 5 CONVENTIONAL ART
FIG. 5 is a plan view of the liquid diluting device shown in FIG. 4.
Figure 6:
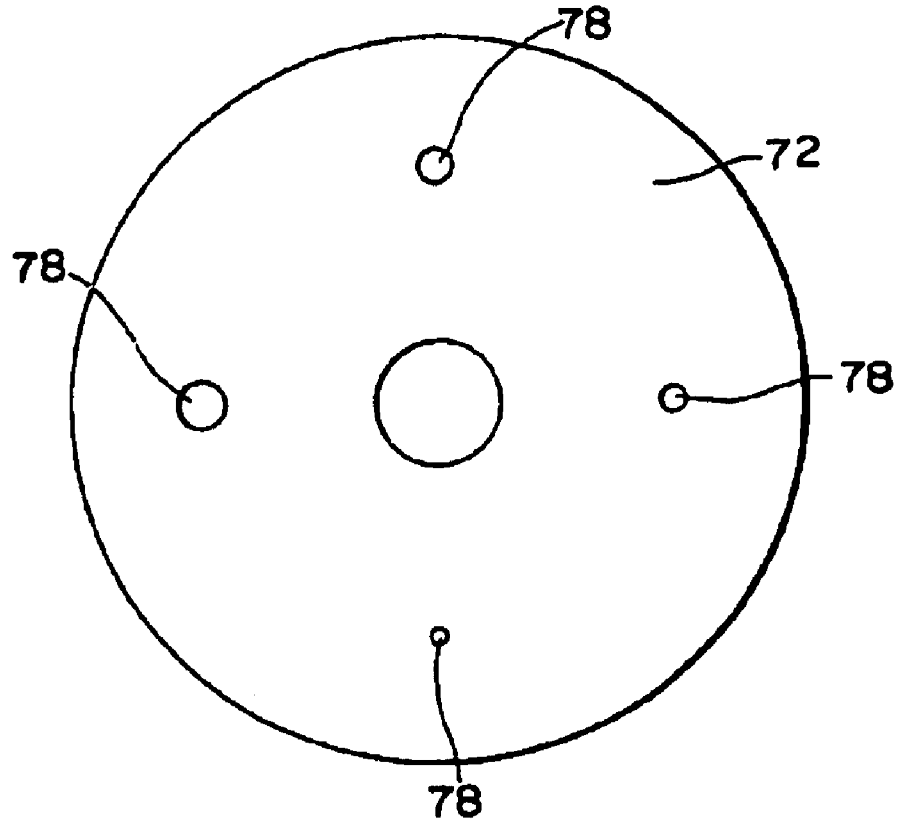
Fig. 6 CONVENTIONAL ART
FIG. 6 is a front elevation of dilution factor switching device used in the known liquid diluting device.

Next, another embodiment of the present invention capable of further varying dilution factor will be described. FIG. 3 shows a cross section of a diluent passage 14*a*, a variation of the diluent passage 14 for introducing special liquid. This diluent passage 14*a* includes a bulkhead 52 for blocking off the passage cross section formed, for example, at a mid point of the passage. This bulkhead 52 can be sufficiently thin to an extent that simple rupture is possible, thus forming destructible barrier walls. It is possible to provide diluent passage 14*a* having the bulkhead 52, as one or more of the diluent passages 14. The diluent passages 14*a* provided with the bulkhead 52 can allow water, for example, to pass into the diluent passage 14*a* due to rupture of the bulkhead 52 in cases where it is desired to increase the dilution factor. This makes it possible to further increase the dilution factor, if desired.

It is preferable for the diluent causing dilution of the special liquid to be liquid, but it is not necessary for it to be water. Other liquids may be used as the diluent.

Also, each of the diluent passages 14 of the first body 10 and the discharge passages 38 of the second body 32 are shown in the figures as being aligned. This need not be the case. For example, it is possible to provide a single discharge passage 38 in the second body 32 and to have all of the plurality of diluent passages 14 connected to this single discharge passage 38. Further, it is generally possible to have less discharge passages 38 than diluent passages 14; and to, in some way, have at lest one discharge passage 38 aligned with multiple diluent passages 14.

As described above, with the liquid diluting device of an embodiment of the present invention, a dial, such as a cylindrical dial, can be provided on the outer side of a body and a plurality of jets of differing diameters can be formed in the dial. The dial can be rotated to introduce special liquid through a jet of desired diameter into a diluent passage, making it possible to carry out an operation of changing the dilution factor with mere rotation of the dial. Thus, such an operation is achieved with a small and simple structure.

By providing the jets in the cylindrical dial, there is no variation in the positional relationship between the dial and a seal member for sealing a liquid introduction device at the time of rotating the dial. Thus, it is possible to reliably prevent leakage of special liquid from the liquid introduction device.

Also, if a plurality of diluent passages are provided in the body and special liquid is introduced into only one of the diluent passages, it is possible to obtain an even higher dilution factor. Further, by providing a bulkhead that is easy to rupture in a diluent passage that special liquid is not introduced into, and rupturing the bulkhead as required, it is possible to obtain a still higher dilution factor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid dilution device, comprising:

at least one diluent passage formed in a body, for introducing a diluent;

a connecting passage, connecting at least one diluent passage with a liquid supply passage; and a dial, rotatably attached to the outer side of the body and positioned between the connecting passage and the liquid supply passage, the dial including a plurality of passages of different diameters for connecting the connecting passage and the liquid supply passage, wherein a concentration of liquid supplied through the liquid supply passage is variable by rotating the dial to align passages of different diameters with the connecting passage and liquid supply passage, wherein a destructible barrier wall is formed along a diluent passage that is not connected to the connecting passage.

2. The liquid dilution device of claim 1, wherein a seal member, including an annular inner side for passing liquid from the liquid supply passage, is provided between a device for liquid introduction and the dial, wherein, with a liquid introduction device attached to the body, the seal member is pushed towards the dial side by the liquid introduction device.

3. The liquid dilution device of claim 2, wherein liquid leakage is prevented by maintaining a positional relationship between the dial and the seal member during rotation of the dial.

4. The liquid dilution device of claim 1, wherein the connecting passage connects only one diluent passage with the liquid supply passage.

5. The liquid dilution device of claim 1, wherein the destructible barrier is formed midway along a diluent passage.

6. The liquid dilution device of claim 1, wherein the dial is cylindrical.

7. The liquid dilution device of claim 1, wherein the plurality of passages in the dial are jets.

8. A liquid dilution device, comprising:

at least one diluent passage formed in a body, for introducing a diluent;

a connecting passage, connecting at least one diluent passage with a liquid supply passage;

a dial, rotatably attached to the outer side of the body and positioned between the connecting passage and the liquid supply passage, the dial including a plurality of passages of different diameters for connecting the connecting passage and the liquid supply passage is variable by rotating the dial to align passages of different diameters with the connecting passage and liquid supply passage; and a negative pressure generating section, connected between the diluent passage and the connecting passage, for generating a negative pressure to introduce liquid from the liquid supply passage to a connected diluent passage, wherein a destructible barrier wall is formed along a diluent passage that is not connected to the connecting passage.

9. The liquid dilution device of claim 8, wherein the connecting passage connects only one diluent passage with the liquid supply passage.

10. The liquid dilution device of claim 8, wherein the destructible barrier is formed midway along a diluent passage.

11. The liquid dilution device of claim 1, wherein the diluent passage is for passing water as the diluent.

12. The liquid dilution device of claim 8, wherein the diluent passage is for passing water as the diluent.

13. The liquid dilution device of claim 1, further comprising:

at least one discharge passage, associated with the at least one diluent passage, for receiving diluted liquid.

14. The liquid dilution device of claim 13, wherein the at least one discharge passage is in a separate second portion of the body, separate from a first portion including the at least one diluent passage.

15. The liquid dilution device of claim 14, wherein the first and second portions of the body are connected.

16. The liquid dilution device of claim 8, further comprising:

at least one discharge passage, connected to the negative pressure generating section, for receiving diluted liquid.

17. The liquid dilution device of claim 16, wherein the at least one discharge passage is in a separate second portion of the body, separate from a first portion including the at least one diluent passage.

18. The liquid dilution device of claim 17, wherein the first and second portions of the body are connected.

19. A liquid dilution device, comprising:

at least one diluent passage formed in a body, for introducing a diluent;

a connecting passage, connecting at least one diluent passage with a liquid supply passage;

a dial, rotatably attached to the outer side of the body and positioned between the connecting passage and the liquid supply passage, the dial including a plurality of passages of different diameters for connecting the connecting passage and the liquid supply passage wherein a concentration of a liquid supplied through the liquid supply passage is variable by rotating the dial to align passages of different diameters with the connecting passage and liquid supply passage;

at least one discharge passage, associated with at least one diluent passage connected to the liquid supply passage for receiving diluted liquid; and at least one discharge passage, associated with at least one diluent passage that is not connected to the liquid supply passage, wherein a destructible barrier wall is formed along the at least one diluent passage that is not connected to the connecting passage.

20. The liquid dilution device of claim 19, wherein the destructible barrier is formed midway along a diluent passage.

21. A liquid dilution device, comprising:

at least one diluent passage formed in a body, for introducing a diluent;

a connecting passage, connecting at least one diluent passage with a liquid supply passage;

a dial, rotatably attached to the outer side of the body and positioned between the connecting passage and the liquid supply passage, the dial including a plurality of passages of different diameters for connecting the connecting passage and the liquid supply passage, wherein a concentration of a liquid supplied through the liquid supply passage is variable by rotating the dial to align passages of different diameters with the connecting passage and liquid supply passage;

a negative pressure generating section, connected between the diluent passage and the connecting passage, for generating a negative pressure to introduce liquid from the liquid supply passage to a connected diluent passage;

at least one discharge passage, associated with at least one diluent passage connected to the liquid supply passage for receiving diluted liquid; and at least one discharge passage, associated with at least one diluent passage that is not connected to the liquid supply passage, wherein a destructible barrier wall is formed along the at least one diluent passage that is not connected to the connecting passage.

22. The liquid dilution device of claim 21, wherein the destructible barrier is formed midway along a diluent passage.

23. The liquid dilution device of claim 22, wherein the diluent is mixed with the variable concentration of liquid supplied in at least one diluent passage to thereby vary dilution of the liquid as concentration of the liquid is varied.

24. The liquid dilution device of claim 23, further comprising:

at least one discharge passage, connected to at least one diluent passage, adapted to discharge the mixed diluent and variable concentration of liquid supplied.

25. The liquid dilution device of claim 22, further comprising:

at least one discharge passage, connected to at least one of the connecting passage and at least one diluent passage, adapted to receive the diluent and the variable concentration of liquid supplied, and adapted to discharge a variable dilution of the liquid, variable as concentration of the liquid is varied.

26. A liquid dilution device, comprising:

at least one diluent passage formed in a body, for introducing a diluent;

a connecting passage, connecting at least one diluent passage with a liquid supply passage; and a dial, rotatably attached to the outer side of the body and positioned between the connecting passage and the liquid supply passage, the dial including a plurality of passages of different diameters for connecting the connecting passage and the liquid supply passage, wherein a concentration of a liquid supplied through the liquid supply passage is variable by rotating the dial to align passages of different diameters with the connecting passage and liquid supply passage, wherein a seal member, including an annular inner side for passing liquid from the liquid supply passage, is provided between a device for liquid introduction and the dial, and wherein the positional relationship between the dial and the seal member is maintained during rotation of the dial.

* * * * *